United States Patent
Ali et al.

(10) Patent No.: US 9,148,022 B2
(45) Date of Patent: Sep. 29, 2015

(54) WIND TURBINE PERMANENT MAGNET SYNCHRONOUS GENERATOR (WT-PMSG) SYSTEM

(71) Applicant: KING FAHD UNIVERSITY OF PETROLEUM AND MINERALS, Dhahran (SA)

(72) Inventors: Mir Sadat Ali, Hyderabad (IN); Abu Hamed M. Abdur-Rahim, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 72 days.

(21) Appl. No.: 14/242,834

(22) Filed: Apr. 1, 2014

(65) Prior Publication Data

US 2015/0076823 A1 Mar. 19, 2015

Related U.S. Application Data

(60) Provisional application No. 61/879,098, filed on Sep. 17, 2013.

(51) Int. Cl.
*H02P 9/00* (2006.01)
*H02J 3/38* (2006.01)
*F03D 7/02* (2006.01)
*F03D 7/04* (2006.01)

(52) U.S. Cl.
CPC .............. *H02J 3/386* (2013.01); *F03D 7/0272* (2013.01); *F03D 7/044* (2013.01)

(58) Field of Classification Search
CPC ........................................ H02P 9/00

USPC ................................................. 322/44; 290/44
See application file for complete search history.

(56) References Cited

U.S. PATENT DOCUMENTS

| | | | |
|---|---|---|---|
| 7,042,110 B2 * | 5/2006 | Mikhail et al. | 290/44 |
| 7,339,355 B2 * | 3/2008 | Erdman et al. | 322/29 |
| 7,432,686 B2 * | 10/2008 | Erdman et al. | 322/44 |
| 7,710,081 B2 * | 5/2010 | Saban et al. | 322/89 |

(Continued)

FOREIGN PATENT DOCUMENTS

JP 2008-148373 6/2008

OTHER PUBLICATIONS

M. Ahsanul Alam et al., Supercapacitor Based Energy Storage System for Effective Fault Ride Through of Wind Generation System, IEEE, Jun. 2010.*

(Continued)

*Primary Examiner* — Joseph Waks
(74) *Attorney, Agent, or Firm* — Richard C. Litman

(57) ABSTRACT

A wind turbine-permanent magnet synchronous generator (WT-PMSG) system includes a variable speed permanent magnet synchronous generator and utilizes a static synchronous compensator (STATCOM) connected on the grid side of the system. A PI/PID controller is designed to apply modulation index control signals to the generator side-converter since the modulation index of the generator side-converter has been determined to have the higher controllability to damp the oscillatory modes of the system when the STATCOM is located at the grid side converter. The controller gains are tuned through a frequency based optimization procedure. This configuration dampens voltage instabilities to provide LVRT compliance.

8 Claims, 6 Drawing Sheets

(56) References Cited

U.S. PATENT DOCUMENTS

| | | | |
|---|---|---|---|
| 8,120,932 B2* | 2/2012 | Folts et al. | 363/37 |
| 2005/0012339 A1* | 1/2005 | Mikhail et al. | 290/44 |
| 2005/0122083 A1* | 6/2005 | Erdman et al. | 322/20 |
| 2008/0007121 A1* | 1/2008 | Erdman et al. | 307/47 |
| 2008/0157529 A1* | 7/2008 | Rivas et al. | 290/44 |
| 2010/0002475 A1* | 1/2010 | Folts et al. | 363/37 |
| 2011/0057444 A1* | 3/2011 | Dai et al. | 290/44 |
| 2012/0280569 A1 | 11/2012 | Alam et al. | |
| 2014/0062269 A1* | 3/2014 | Crane | 310/68 R |

OTHER PUBLICATIONS

T. T. Nguyen et al., Dynamic Performance of a Grid Connected Wind Generation System with Fuzzy Logic Controlled Variable Capacitance Compensation, AUPEC08, 2008.*

S. Muyeen, M. Ali, R. Takahashi, T. Murata, and J. Tamura, "Wind generator output power smoothing and terminal voltage regulation by using STATCOM/ESS," Power Tech, 2007 IEEE Lausanne, pp. 1232-1237.

Naguib Eskander, Mona. and Amer, Sanaa, "Mitigation of Voltage Dips and Swells in Grid-connected Wind Energy Conversion Systems",IETE Journal of Research, vol. 57, No. 6, pp. 515-524, 2011.

Z. Chen, F. Blaabjerg, and Y. Hu, "Stability improvement of wind turbine systems by STATCOM," IEEE Industrial Electronics, IECON 2006—32nd Annual Conference on, pp. 4213-4218.

C. Han, A. Q. Huang, M. E. Baran, S. Bhattacharya, W. Litzenberger, L. Anderson, A. L. Johnson, and A. A. Edris, "STATCOM impact study on the integration of a large wind farm into a weak loop power system," Energy Conversion, IEEE Transactions on, vol. 23, pp. 226-233, 2008.

L. Qi, J. Langston, and M. Steurer, "Applying a STATCOM for stability improvement to an existing wind farm with fixed-speed induction generators," Power and Energy Society General Meeting—Conversion and Delivery of Electrical Energy in the 21st Century, IEEE 2008, pp. 1-6.

S. Muyeen, M. A. Mannan, H. Ali, R. Takahashi, T. Murata, and J. Tamura, "Stabilization of grid connected wind generator by STATCOM," Power Electronics and Drives Systems, 2005. PEDS 2005. International Conference on, pp. 1584-1589.

* cited by examiner

WIND TURBINE PERMANENT MAGNET SYNCHRONOUS GENERATOR (WT-PMSG) SYSTEM

CROSS-REFERENCE TO RELATED APPLICATION

This application claims the benefit of U.S. Provisional Patent Application Ser. No. 61/879,098, filed Sep. 17, 2013.

BACKGROUND OF THE INVENTION

1. Field of the Invention

The present invention relates to wind power generation systems, and particularly to a variable speed wind turbine PMSG system utilizing a static synchronous compensator (STATCOM) connected on the grid side of the system.

2. Description of the Related Art

Some of the major concerns of variable speed wind generating systems are the stability issues, power quality and voltage instability problems occurring in a power system that are not able to meet the reactive power demand during faults and heavy loading conditions. Low voltage ride through (LVRT) is a recently introduced requirement that transmission operators demand from wind farms.

Among the energy storage elements STATCOM is a relatively popular device. The main motivation for choosing STATCOM in wind farms is its ability to provide voltage support either by supplying/absorbing reactive power into the system. A STATCOM is reported to be effective in providing LVRT for wind turbines in a wind farm but its application in terms of PMSG systems is not fully explored. For example, the ideal location of the device needs careful investigation. Stability studies in variable speed wind turbine generating systems are required to ensure a safe operation with good performance.

Thus, a PMSG wind generator using static synchronous compensation (STATCOM) for control damping solving the aforementioned problems is desired.

SUMMARY OF THE INVENTION

The variable speed wind turbine-permanent magnet synchronous generator (WT-PMSG) system utilizes a static synchronous compensator (STATCOM) connected on the grid side of the system. A PI/PID controller having a design which applies modulation index control signals is connected to the generator side-converter since the modulation index of the generator side-converter has been determined to have the higher controllability to damp the oscillatory modes of the system when the STATCOM is located at the grid side converter. The controller gains are tuned through a frequency based optimization procedure. This configuration dampens voltage instabilities to provide LVRT compliance.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
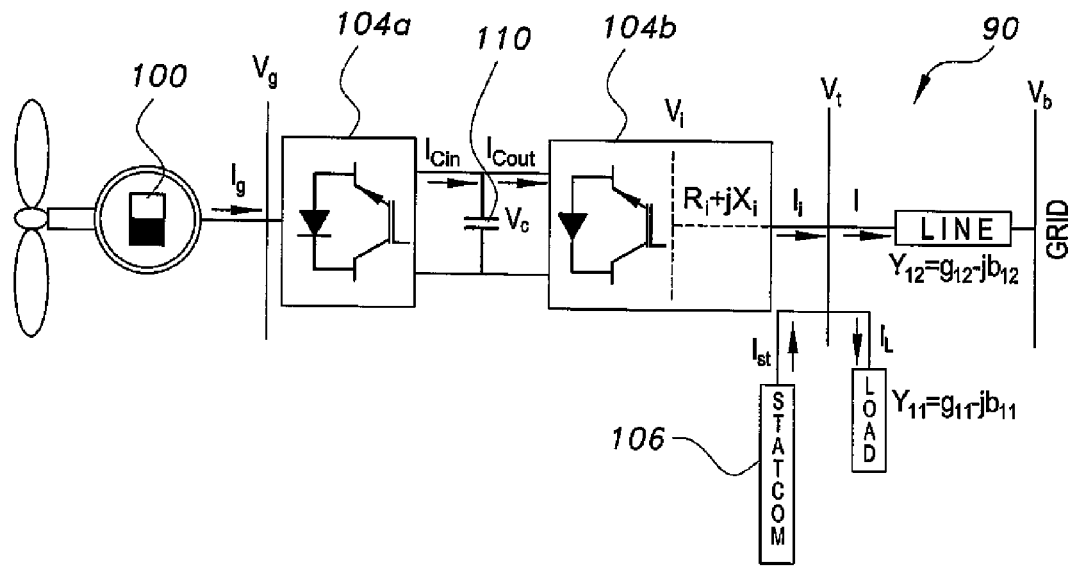
FIG. 1 is a block diagram illustrating a Variable Speed WT-PMSG with STATCOM on grid side-converter according to the present invention.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions, but excludes intangible media or transient waveforms or signals.

The variable speed wind turbine-permanent magnet synchronous generator (WT-PMSG) system utilizes a static synchronous compensator (STATCOM) connected on the grid side of the system. A PI/PID controller having a design which applies modulation index control signals is connected to the generator side-converter since the modulation index of the generator side-converter has been determined to have the higher controllability to damp the oscillatory modes of the system when the STATCOM 106 is located at the grid side converter. The controller gains are tuned through a frequency based optimization procedure. This configuration dampens voltage instabilities to provide LVRT compliance.

A STATCOM is a shunt device of the Flexible AC Transmission Systems (FACTS) family using power electronics to control power flow and improve transient stability on power grids. The STATCOM regulates voltage at its terminal by controlling the amount of reactive power injected into or absorbed from the power system. When system voltage is low, the STATCOM generates reactive power (STATCOM capacitive). When system voltage is high, it absorbs reactive power (STATCOM inductive).

The variation of reactive power is performed by means of a Voltage-Sourced Converter (VSC) connected on the secondary side of a coupling transformer. The VSC 206 uses forced-commutated power electronic devices (GTOs, IGBTs or IGCTs) to synthesize a voltage from a DC voltage source. The STATCOM 106 was chosen in this system to provide voltage stability for weak grids, and the like. For example, the relative impedance for weak grids is high, so the impact of Q support is usually significant. If wind turbines are connected to a weak system, more power control is required to keep the system stable during and after a fault.

A turbine's low voltage ride through (LVRT) capability is its ability to survive a transient voltage dip without tripping. Wind turbines' LVRT capability is vital for wind farm interconnection because the tripping of a wind farm due to a fault on a nearby power line results in the loss of two major system components (the line and the wind farm). It is important to modify the performance of the wind energy systems by modifying the design of mechanical and electrical systems. Thus the present system employs a STATCOM 106 which acts as a central controller to the grid connected wind turbine system. The STATCOM 106 is from the family of FACTS devices that can be used effectively in wind farms to provide transient voltage support to prevent system collapse. The STATCOM 106 can also contribute to the low voltage ride through requirement because it can operate at full capacity even at lower voltages. In the present invention, a voltage source converter (VSC) PWM technique based STATCOM 106 is provided to stabilize the grid connected PMSG based variable speed wind turbine shown in FIG. 1.

Figure 2:
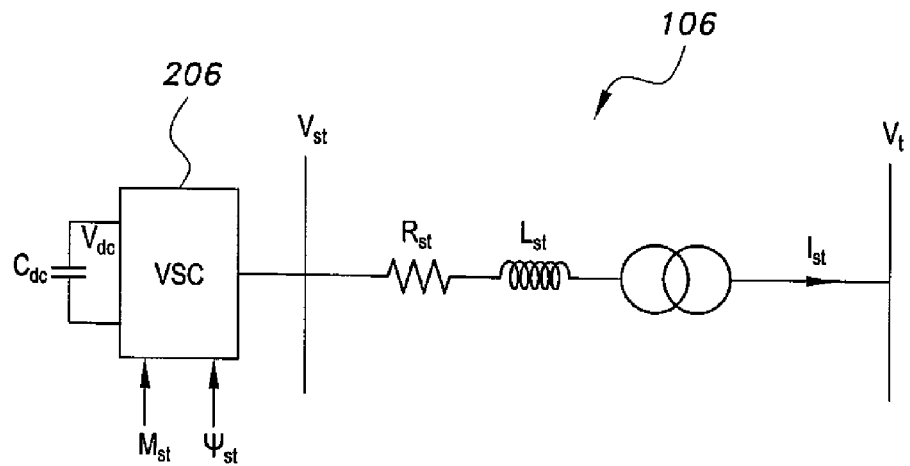
FIG. 2 is a basic model of the STATCOM 106 which is used in the Variable Speed WT-PMSG, according to the present invention.

A schematic diagram of the variable speed wind turbine-permanent magnet synchronous generator (WT-PMSG) system 90 is shown in FIG. 1. Details of the STATCOM 106 are shown in FIG. 2. The permanent magnet synchronous generator 100 is driven by a horizontal axis wind turbine. The converters are located in between the generator terminals and the grid. A high efficiency low speed PMSG as shown in FIG. 1 The PMSG is connected directly to the wind turbine, which results in a simple mechanical system that has advantages over a gearbox connected generator-WT. Many disadvantages can also be avoided in a gearless wind turbine generator. The noise caused mainly at high rotational speed can be reduced and also high overall efficiency and reliability are achieved in addition to reduced weight and diminished need for maintenance. Moreover, the directly connected wind turbine generator can extract maximum power at different wind speeds. In the variable speed operation, there is a reduction of the drivetrain noise, reduction in mechanical stresses, and the increased energy capture. The system model, given in the following, includes that of the wind turbine, the wind system, the PMSG, the converter circuits, the load and transmission line connected at grid side.

The stator of the PMSG is directly connected to the power electronics converter which is controlled by controlling the IGBT switches. The power electronics converter is a back-to-back converter system consisting of two voltage source converters (VSC) connected through a DC link. The stator circuit of the generator feeds the generator side-converter (rectifier) system. The STATCOM, i.e., grid side-converter (inverter) system 106 maximizes the power injected into the DC link of the back-to-back converter with the active power exchanged with the grid. The power electronics frequency converter provides a connection between the stator circuit operating at variable frequency and the power grid being at the fixed frequency. The linearized model of each component is derived from their corresponding non-linear dynamics.

A non-linear model with the STATCOM 106 on the load side-converter as shown in FIG. 1 is obtained from system parameters to form a 12th order model defined by a set of closed form state equations (1).

$$p(i_{gd}) = \frac{\omega_o}{X_d}[-R_a i_{gd} + X_q i_{gq}\omega_g - m_1 V_c \sin\delta] \quad (1)$$

$$p(i_{gq}) = \frac{\omega_o}{X_q}[-X_d i_{gd}\omega_g - R_a i_{gq} + \Psi_o \omega_g - m_1 V_c \cos\delta]$$

$$p(\delta) = \omega_o(\omega_g - 1)$$

$$p(\omega_g) = \frac{1}{2H_g}[K_s\theta_s - P_{ag} - D_g(\omega_g - 1)]$$

$$p(\theta_s) = \omega_o(\omega_t - \omega_g)$$

$$p(\omega_t) = \frac{1}{2H_t}[P_m - K_s\theta_s - D_t(\omega_t - 1)]$$

$$p(V_c) = \frac{1}{C}[+m_1 i_{gd}\sin\delta + m_1 i_{gq}\cos\delta - m_2 i_{id}\cos\alpha_2 + m_2 i_{iq}\sin\alpha_2]$$

$$p(i_{id}) = \frac{\omega_o}{X_i}[-(R_i + k_1)i_{id} + (\omega_e X_i - k_2)i_{iq} -$$

$$m_2 V_c \cos\alpha_2 - k_1 i_{std} - k_2 i_{stq} - V_b(k_1 g_{12} - k_2 b_{12})]$$

$$p(i_{iq}) = \frac{\omega_o}{X_i}[-(\omega_e X_i + k_3)i_{id} - (R_i + k_4)i_{iq} + m_2 V_c \sin\alpha_2 -$$

$$k_3 i_{std} - k_4 i_{stq} - V_b(k_3 g_{12} - k_4 b_{12})]$$

$$p(i_{std}) = \frac{\omega_o}{L_{st}}[-k_1 i_{id} - k_2 i_{iq} - R_{st} i_{std} + \omega_e L_{st} i_{stq} +$$

$$m_{st} V_{dc} \cos\Psi_{st} - V_b(k_1 g_{12} - k_2 b_{12})]$$

$$p(i_{stq}) = \frac{\omega_o}{L_{st}}[-k_3 i_{id} - k_4 i_{iq} - \omega_e L_{st} i_{std} - R_{st} i_{stq} +$$

$$m_{st} V_{dc} \sin\Psi_{st} - V_b(k_3 g_{12} - k_4 b_{12})]$$

$$p(V_{dc}) = -\frac{m_{st}}{C_{dc}}[\cos\Psi_{st} i_{std} + \sin\Psi_{st} i_{stq}]$$

In the system of equations (1), $\Psi_O$ is the residual flux linkage of the permanent magnet rotor, while $\Psi_{st}$ is the firing (phase) angle of the STATCOM. Here, $\delta$ and $\omega_g$ are the load angle and rotor speed of the PMSG, $\theta_s$ is the stiffness coefficient of the shaft and $\omega_t$ is the turbine speed. Moreover, $P_m$ is the mechanical power of the wind turbine, and $P_{ag}$ is the electrical air-gap power. The control input $m_2$ is the modulation index of the grid side-converter (inverter) system, $\alpha_2$ is the extinction angle of the inverter and $V_c$ is DC link capacitor voltage. The basic Statcom 106 is shown in FIG. 2. The above STATCOM control parameters of equation system (1) are derived from the fact that in general, the connection of the STATCOM 106 to the PMSG system at bus has voltage $V_t\angle\theta_t$. The STATCOM 106 is modeled as a controllable voltage source which supplies the reactive power by varying the modulation index ($m_{st}$) of the VSC. The storage capacitor can cater to limited real power through the variation of the phase angle ($\psi_{st}$). Hence, the general expression is, $$V_t = |V_t|\angle\theta_t \quad (2)$$

The output voltage of the voltage source converter in terms of modulation index and phase angle can be written as;

$$V_{st} = m_{st}V_{dc}\angle\Psi_{st} \quad (3)$$

The resultant direct (d) and quadrature (q) components are given in equation system (1), where $R_{st}$ and $L_{st}$ are the resistance and inductance of the STATCOM, and $V_{st}$ and $I_{st}$ are the STATCOM output voltage and output current respectively.

As shown in FIG. 1, the permanent magnet synchronous generator (PMSG) 100 is connected to the power grid via a full-scale, back-to-back conversion assembly through a DC link capacitor. It should be understood that the wind turbine shaft is directly coupled to the generator rotor of the PMSG 100. The generator side and the grid side back-to-back converters 104a and 104b are connected to each other through a DC link capacitor 110. The system dynamic model includes PMSG 100, wind turbine, the converters 104a, 104b, STATCOM 106, the load, and the transmission line. The linear model of the PMSG-STATCOM system 90 is required for control design purposes as will be shown in the following chapters. The system equations of the linearized model are written as $$\Delta \dot{x} = A\Delta x + B\Delta u, \quad (4)$$

where, $\Delta x$ is the perturbation or change in the original state variable X. The matrices A and B will be different depending on the location of the Statcom 106. Equation (5) gives the linearized state equation and Table 1 gives the details of the derivation of the A & B matrices for the preferred embodiment where the STATCOM 106 is located at the grid side of the PMSG system.

$$\begin{bmatrix} p\Delta i_{gd} \\ p\Delta i_{gq} \\ p\Delta \delta \\ p\Delta \omega_g \\ p\Delta \theta_s \\ p\Delta \omega_t \\ p\Delta V_c \\ p\Delta i_{id} \\ p\Delta i_{iq} \\ p\Delta i_{std} \\ p\Delta i_{stq} \\ p\Delta V_{dc} \end{bmatrix} = \begin{bmatrix} A_{1,1} & A_{1,2} & A_{1,3} & A_{1,4} & 0 & 0 & A_{1,7} & 0 & 0 & 0 & 0 & 0 \\ A_{2,1} & A_{2,2} & A_{2,3} & A_{2,4} & 0 & 0 & A_{2,7} & 0 & 0 & 0 & 0 & 0 \\ 0 & 0 & 0 & A_{3,4} & 0 & 0 & 0 & 0 & 0 & 0 & 0 & 0 \\ A_{4,1} & A_{4,2} & A_{4,3} & A_{4,4} & A_{4,5} & 0 & A_{4,7} & 0 & 0 & 0 & 0 & 0 \\ 0 & 0 & 0 & A_{5,4} & 0 & A_{5,6} & 0 & 0 & 0 & 0 & 0 & 0 \\ 0 & 0 & 0 & 0 & A_{6,5} & A_{6,6} & 0 & 0 & 0 & 0 & 0 & 0 \\ A_{7,1} & A_{7,2} & A_{7,3} & 0 & 0 & 0 & 0 & A_{7,8} & A_{7,9} & 0 & 0 & 0 \\ 0 & 0 & 0 & 0 & 0 & 0 & A_{8,7} & A_{8,8} & A_{8,9} & A_{8,10} & A_{8,11} & 0 \\ 0 & 0 & 0 & 0 & 0 & 0 & A_{9,7} & A_{9,8} & A_{9,9} & A_{9,10} & A_{9,11} & 0 \\ 0 & 0 & A_{10,3} & 0 & 0 & 0 & A_{10,7} & 0 & 0 & A_{10,10} & A_{10,11} & A_{10,12} \\ 0 & 0 & A_{11,3} & 0 & 0 & 0 & A_{11,7} & 0 & 0 & A_{11,10} & A_{11,11} & A_{11,12} \\ 0 & 0 & 0 & 0 & 0 & 0 & 0 & 0 & 0 & A_{12,10} & A_{12,11} & 0 \end{bmatrix} \quad (5)$$

$$\begin{bmatrix} \Delta i_{gd} \\ \Delta i_{gq} \\ \Delta \delta \\ \Delta \omega_g \\ \Delta \theta_s \\ \Delta \omega_t \\ \Delta V_c \\ \Delta i_{id} \\ \Delta i_{iq} \\ \Delta i_{std} \\ \Delta i_{stq} \\ \Delta V_{dc} \end{bmatrix} + \begin{bmatrix} B_{1,1} & 0 & 0 & 0 & 0 \\ B_{2,1} & 0 & 0 & 0 & 0 \\ 0 & 0 & 0 & 0 & 0 \\ B_{4,1} & 0 & 0 & 0 & 0 \\ 0 & 0 & 0 & 0 & 0 \\ 0 & 0 & 0 & 0 & 0 \\ B_{7,1} & B_{7,2} & B_{7,3} & 0 & 0 \\ 0 & B_{8,2} & B_{8,3} & 0 & 0 \\ 0 & B_{9,2} & B_{9,3} & 0 & 0 \\ 0 & 0 & 0 & B_{10,4} & B_{10,5} \\ 0 & 0 & 0 & B_{11,4} & B_{11,5} \\ 0 & 0 & 0 & 0 & 0 \end{bmatrix} \begin{bmatrix} \Delta m_1 \\ \Delta m_2 \\ \Delta \alpha_2 \\ \Delta m_{st} \\ \Delta \Psi_{st} \end{bmatrix}$$

TABLE 1

Linearized 12x12 matrix Eqn. (5) state matrix detail $A(1,1) = -((\omega_o R_a)/X_d)$ $A(1,2) = -((\omega_o X_q)/X_d)$ $A(1,3) = -\dfrac{\omega_o m_{10} V_{co} \cos\delta_o}{X_d}$ $A(1,4) = (\omega_o X_q i_{gqo})/X_d$ $A(1,7) = -\dfrac{\omega_o m_{10} V_{co} \sin\delta_o}{X_d}$ $A(2,1) = -((\omega_o X_d)/X_q)$ $A(2,2) = -((\omega_o R_a)/X_q)$ $A(2,3) = ((\omega_o m_{10} V_{co} \sin\delta_o)/X_q)$ $A(2,4) = (\omega_o(\Psi_o - X_d i_{gdo}))/X_q$ $A(2,7) = -((\omega_o m_{10} \cos\delta_o)/X_q)$ $A(3,4) = \omega_o$ $A(4,1) = -(2R_a i_{gdo} - V_{gdo})/2H_g$ $A(4,2) = -(2R_a i_{gqo} + V_{gqo})/2H_g$ $A(4,3) = +(V_{gdo} i_{gqo} - V_{gqo} i_{gdo})/2H_g$ $A(4,4) = -D_g/2H_g$ $A(4,5) = +K_s/2H_g$ $A(4,7) = -(V_{gdo} i_{gdo} + V_{gqo} i_{gqo})/V_{co} 2H_g$ $A(5,4) = -\omega_o$ $A(5,6) = \omega_o$ $A(6,5) = -K_s/2H_t$ $A(6,6) = -\dfrac{\left(\begin{array}{c} 6C_1\omega_{to}^5 + 5C_2\omega_{to}^4 + 4C_3\omega_{to}^3 + \\ 3C_4\omega_{to}^2 + 2C_5\omega_{to}^1 + C_6 \end{array}\right) + D_t}{2H_t}$ $A(7,1) = (m_{10} \sin\delta_o)/C$ $A(7,2) = (m_{10} \cos\delta_o)/C$ $A(7,3) = (m_{10} i_{gdo} \cos\delta_o - m_{10} i_{gqo} \sin\delta_o)/C$ $A(7,8) = (-m_{20} \cos\alpha_{20})/C$ $A(7,9) = (m_{20} \sin\alpha_{20})/C$ $A(8,7) = -\dfrac{\omega_o m_{20} \cos\alpha_{20}}{X_i}$ $A(8,8) = -\omega_o \dfrac{R_1 + K_1}{X_i}$ $A(8,9) = \omega_o \dfrac{X_i - K_2}{X_i}$ $A(8,10) = -\omega_o \dfrac{K_1}{X_i}$ $A(8,11) = -\omega_o \dfrac{K_2}{X_i}$ $A(9,8) = -\omega_o \dfrac{X_i + K_3}{X_i}$ $A(9,7) = -\dfrac{\omega_o m_{20} \sin\alpha_{20}}{X_i}$ $A(9,9) = \omega_o \dfrac{R_i + K_4}{X_i}$ TABLE 1-continued Linearized 12x12 matrix Eqn. (5) state matrix detail $A(9, 10) = -\omega_o \dfrac{K_3}{X_i}$ $A(9, 11) = -\omega_o \dfrac{K_4}{X_i}$ $A(10, 3) = -\omega_o \dfrac{V_{gqo}}{L_{st}}$ $A(10, 7) = -\dfrac{\omega_o m_{1o} \sin\delta_o}{L_{st}}$ $A(10, 10) = -\omega_o \dfrac{R_{st}}{L_{st}}$ $A(10, 11) = \omega_o$ $A(10, 12) = -\dfrac{\omega_o m_{sto} \cos\Psi_{sto}}{L_{st}}$ $A(11, 3) = \omega_o \dfrac{V_{gdo}}{L_{st}}$ $A(11, 7) = -\dfrac{\omega_o m_{1o} \cos\delta_o}{L_{st}}$ $A(11, 10) = -\omega_o$ $A(11, 11) = -\omega_o \dfrac{R_{st}}{L_{st}}$ $A(11, 12) = +\dfrac{\omega_o m_{sto} \sin\Psi_{sto}}{L_{st}}$ $A(12, 10) = -\dfrac{m_{sto} \cos\Psi_{sto}}{C_{dc}}$ $A(12, 11) = -\dfrac{m_{sto} \sin\Psi_{sto}}{C_{dc}}$ $B(1, 1) = -\left(\dfrac{\omega_o V_{co} \sin\delta_o}{X_d}\right)$ $B(2, 1) = -\left(\dfrac{\omega_o V_{co} \cos\delta_o}{X_q}\right)$ $B(4, 1) = -\dfrac{V_{co}(\sin\delta_o i_{gdo} + \cos\delta_o i_{gqo})}{2H_g}$ $B(7, 1) = \dfrac{\sin\delta_o i_{gdo} + \cos\delta_o i_{gqo}}{C}$ $B(7, 2) = -\dfrac{\sin\alpha_{2o} i_{iqo} - \cos\alpha_{2o} i_{ido}}{C}$ $B(7, 3) = +\dfrac{m_{2o}(\sin\alpha_{2o} i_{ido} + \cos\alpha_{2o} i_{iqo})}{C}$ $B(8, 2) = -\left(\dfrac{\omega_o V_{co} \cos\alpha_{2o}}{X_i}\right)$ $B(8, 3) = \dfrac{\omega_o m_{2o} V_{co} \sin\alpha_{2o}}{X_i}$ $B(9, 2) = \dfrac{\omega_o V_{co} \sin\alpha_{2o}}{X_i}$ $B(9, 3) = \dfrac{\omega_o m_{2o} V_{co} \cos\alpha_{2o}}{X_i}$ $B(10, 4) = \dfrac{\omega_o V_{dco} \cos\Psi_{sto}}{L_{st}}$ $B(10, 5) = -\dfrac{\omega_o V_{stqo}}{L_{st}}$ $B(11, 4) = -\dfrac{\omega_o m_{dco} \sin\Psi_{sto}}{L_{st}}$ $B(11, 5) = \dfrac{\omega_o V_{stdo}}{L_{st}}$ Small signal analysis starts with the aforementioned linearized system equations. For an appropriate output variable y, the linearized system equations are expressed in the form, $$\dot{x} = Ax + Bu$$

$$y = Cx + Du \qquad (6)$$

Small signal analysis is used to determine the frequency response of the system control design and identifies damping characteristics associated with them, if any. The linearized model of the composite WT-PMSG with grid-side connected STATCOM system 90 is used for performing small signal analysis. Eigen values are obtained for the system with STATCOM 106 connected on grid side-converter. For the analysis nominal loading of the variable speed wind turbine PMSG system is taken as 65% for a nominal wind velocity of 11.95 m/sec with a load of 100% operating at a steady state grid bus voltage of 1.03 p.u. System parameters for the composite system are shown in Table 2. Load Admittance $(Y_{11})$=0.2-j0.4 p.u. Transmission line impedance $(Z_{line})$=R+jX=0.16+j0.2 p.u.

TABLE 2

System parameters and operating values

| Wind Plant | PMSG | STATCOM |
|---|---|---|
| Nominal Power: 2 MW | Rated Power: 2 MW j1063.1562 | $R_{st}$: 0.01 p.u. |
| Rotor diameter: 75 m | Stator rated line voltage: | $L_{st}$: 0.15 p.u |
| Rotating Speed: | 690 V voltage | $C_{dc}$: 1 p.u |
| 6.0-19.5 rpm | Rated frequency: 50 Hz | |
| Nominal Wind | Pole Pairs: 154 | |
| Speed: 11.95 m/sec | $R_a$: 0.01 p.u. | |
| | $X_d$: 0.8 p.u | |
| | $X_q$: 0.5 p.u | |
| | $D_g$: 0.6 p.u | |
| | $H_g$: 0.5 p.u | |
| | $H_t$: 3 p.u | |
| | $K_S$: 0.3 p.u | |
| | $D_t$: 0.6 p.u | |
| | $R_i$: 0.01 p.u | |

TABLE 2-continued

System parameters and operating values

| Wind Plant | PMSG | STATCOM |
|---|---|---|
| | $X_i$: 0.1 p.u | |
| | C: 1 p.u. | |

Eigen values of the variable speed PMSG with STATCOM on grid side-converter are shown in Table 3.

TABLE 3

Eigen values for WT-PMSG with STATCOM on grid side-converter

| | Real part | Imaginary part |
|---|---|---|
| PMSG | −503 | ±1266.8i |
| | −0.0 | ±28.5i |
| | −0.10 | ±3.7i. |
| | −1.3 | 0 |
| | −5.3. | ±315i |
| STATCOM | −24.9 | ±316.2i |
| | −0.0 | |

Figure 3:
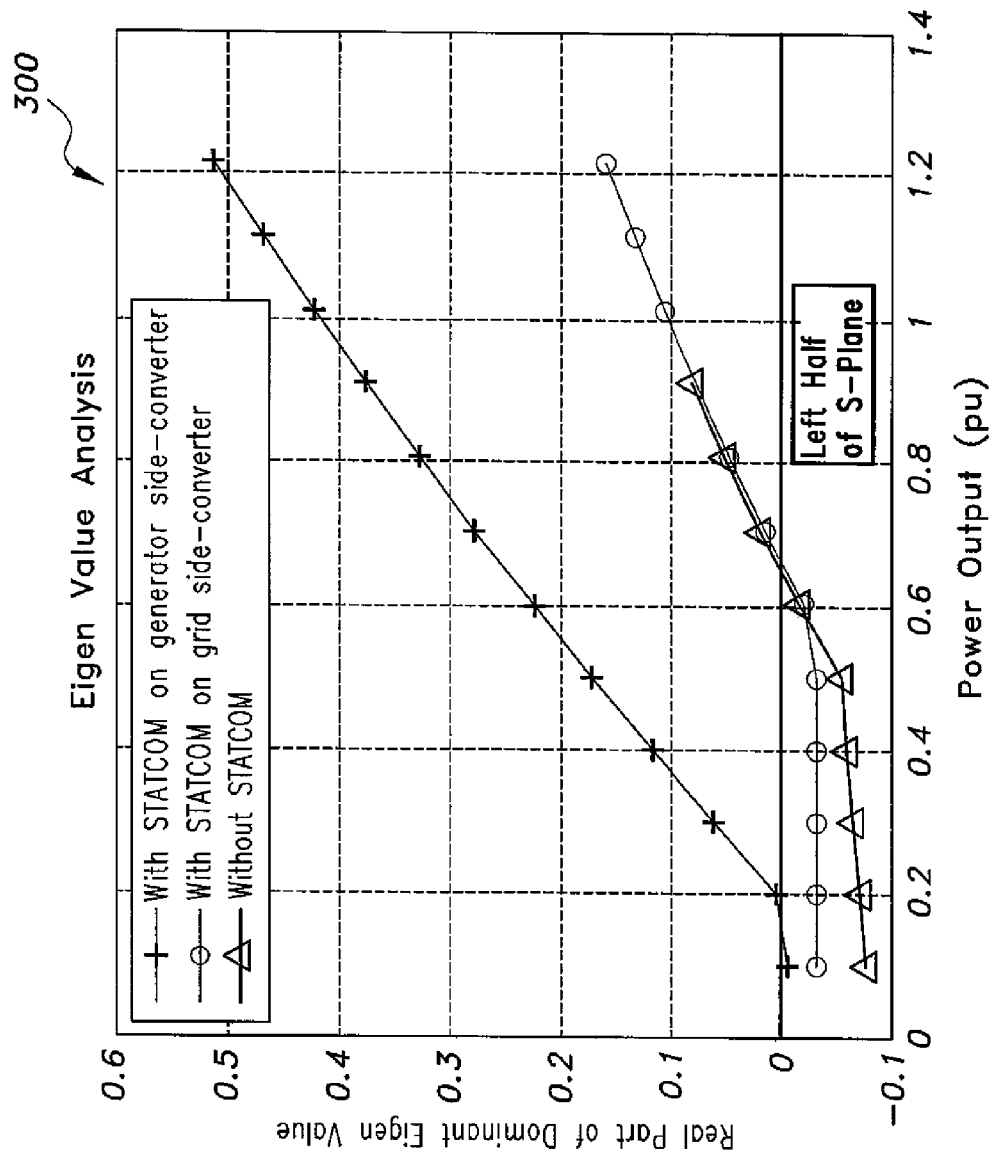
FIG. 3 is a plot showing power output vs. Real Part of Dominant Eigen Value for a PMSG under different configurations.

Eigen values of the variable speed PMSG with STATCOM 106 on grid side-converter identified as critical in terms of their location from jω axis for a nominal loading of 0.65 p.u. are −0.0±28.5 i. The mode type is electromechanical. Plot 300 of FIG. 3 shows the variation of the real part of the dominant Eigen value of the variable speed wind turbine PMSG system, when the power output is varied from 0.1 to 1.2 p.u. and wind power contribution is changed by a disturbance of 0.15 p.u. respectively. As shown in plot 300 of FIG. 3, the grid side-converter located STATCOM 106 is within the stability limit up to nominal loading of 0.65 p.u.

Evaluation of converter control variables $[m_1, m_2, \alpha_2, m_{st}, \Psi_{st}]$ using singular value decomposition (SVD) method, Hankel singular value (HSV) method, and residue method all indicate that the most stable damping control of the system is achieved when the control variable $m_1$ is used to control the system via the generator-side power inverter's modulation index control.

For an m×n matrix G, the singular value decomposition (SVD) of G is the factorization, $$G = U\Sigma V^{*T}, \quad (7)$$

where, $$\Sigma = \begin{bmatrix} \Sigma_1 & 0 \\ 0 & 0 \end{bmatrix}$$

is an m×n matrix and $\Sigma_1$ is defined as, $$\sum\nolimits_1 = \begin{bmatrix} \sigma_1 & 0 & \cdots & 0 \\ 0 & \sigma_2 & \cdots & 0 \\ \cdots & \cdots & \cdots & \cdots \\ 0 & 0 & 0 & \sigma_r \end{bmatrix} \quad (8)$$

Figure 4:
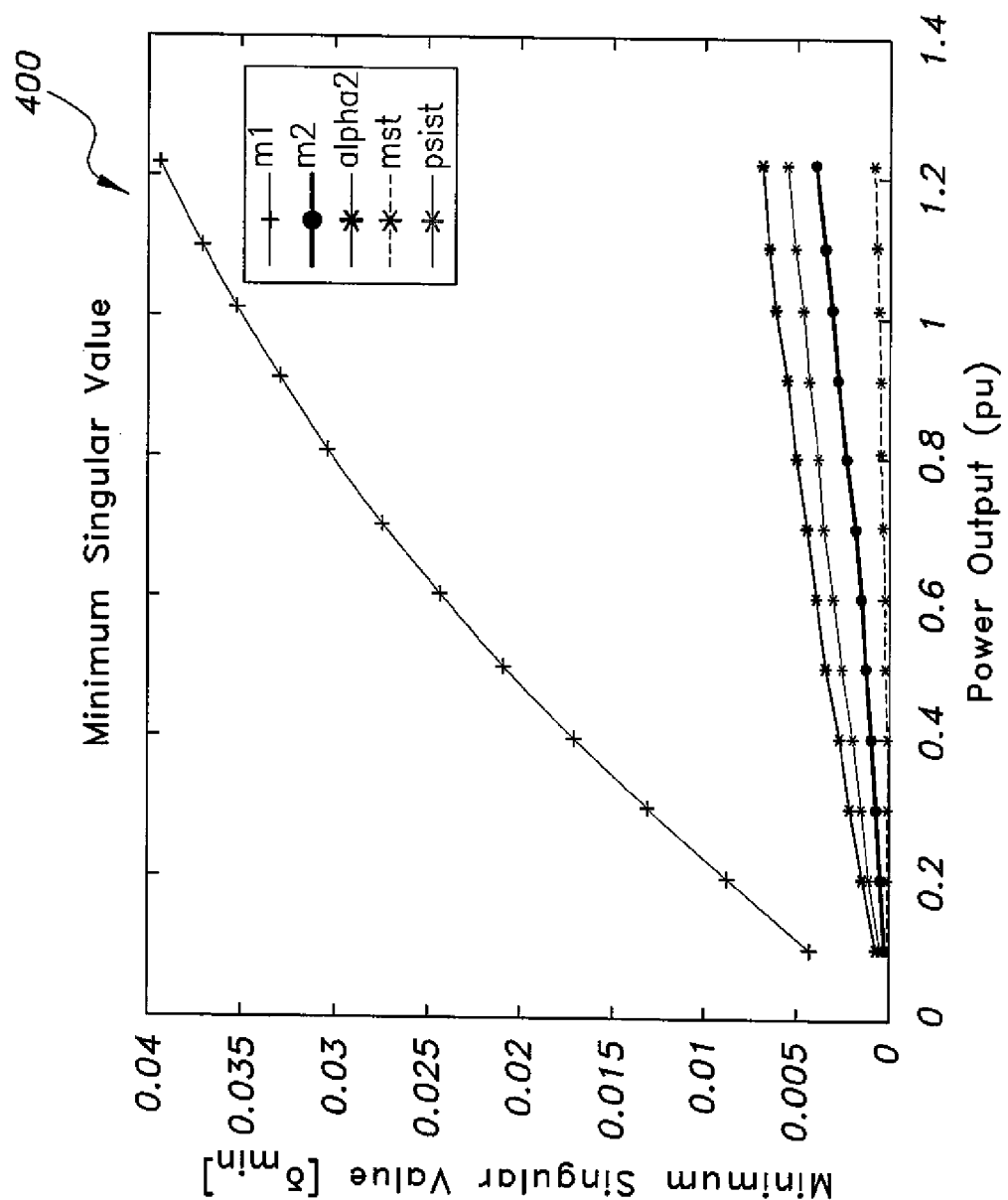
FIG. 4 is a plot showing power output vs. Minimum Singular Value for various control variables.

The singular values $\sigma_1, \sigma_2, \ldots \sigma_T$ are placed in descending order with r=min{m,n}. U and V are unitary matrices; V are the right singular vectors and U are the left singular vectors. The maximum singular value of G ($\sigma_1$) shows the largest gain for any input direction, while the smallest singular value ($\sigma_r$) is a useful controllability measure showing the smallest gain for any input direction. It is desired that the minimum singular values be as large as possible when selecting between different input output variables. For the aforementioned linearized system model, the SVD of the matrix G=[A−λIB]; where B=[$b_1$ $b_2$ $b_3$ $b_4$ $b_5$] is to be carried out for each $b_i$. Here, the 12 Eigen values of the A matrix for a nominal loading of 65% are shown in Table 3 supra. Using the parameters of the variable speed wind turbine PMSG system 90, the first pair of complex conjugate Eigen values is contributed by the generator circuits, while second and third pair is from a model of the drive-train and fourth one from the DC link while the fifth pair arises from the grid side converter circuit and the last two pairs are from the Statcom 106. The minimum singular value $\sigma_{min}$ of the matrix [λiI−A bi] indicates the capability of the $i^{th}$ input to the lightly damped mode $\lambda_i$. The higher $\sigma_{min}$ the higher is the controllability of this mode for the input considered. Plot 400 of FIG. 4 illustrates minimum singular value $\sigma_{min}$ for the 5 control variables [$m_1$, $m_2$, $\alpha_2$, $m_{st}$, $\Psi_{st}$] against a number of values of generator loading points.

From plot 400 it can be observed that the minimum singular values of the modulation index of the generator-side converter ($m_1$) are significantly large compared to the other ones for each loading condition, suggesting this to be the most effective converter damping control when STATCOM 106 is connected at grid side-converter.

Hankel singular value decomposition confirms the results obtained using the aforementioned Singular Value Decomposition method. Hankel singular values provide a measure of energy for a state in the system. It is the basis for the balanced model reduction, in which high energy states are retained, while the low energy states are discarded. For the linearized system equation (5) Hankel singular value (HSV) of the system can be obtained from the controllability and observability gramians. The linear controllability gramian for pair (A, B) is defined as, $$W_c = \int_0^\infty e^{At} BB^T e^{A^T t} dt \quad (9)$$

If the system is stable and controllable then the controllability gramian will have full rank. The linear observability gramian for pair (A, C) is defined as, $$W_o = \int_0^\infty e^{At} CC^T e^{A^T t} dt \quad (10)$$

For stable and observable systems the observability gramian will have full rank n. The linear gramians $W_c$ and $W_o$ are the unique positive definite solutions of the lyapunov equations, $$AW_c + W_c A^T = -BB^T$$

$$A^T W_o + W_o A = -C^T C \quad (11)$$

The Hankel singular value a is an observability-controllability index, defined as, $$\sigma_i = \sqrt{\lambda_i(W_c W_o)} \, i = 1, 2, \ldots n \quad (12)$$

This reflects the joint controllability and observability of the states of a system where $\lambda_i(W_c W_o)$ is the i-th Eigen value of $W_c W_o$. Hankel singular values measure the contribution of each state to evaluate the input/output behavior of the linear system. Choosing different input and output signals, the HSV can be calculated for each combination of input and output; the candidate with the largest HSV shows better controllability and observability properties. Actually, the larger the Hankel singular value, the higher the energy contained by that state.

Figure 5:
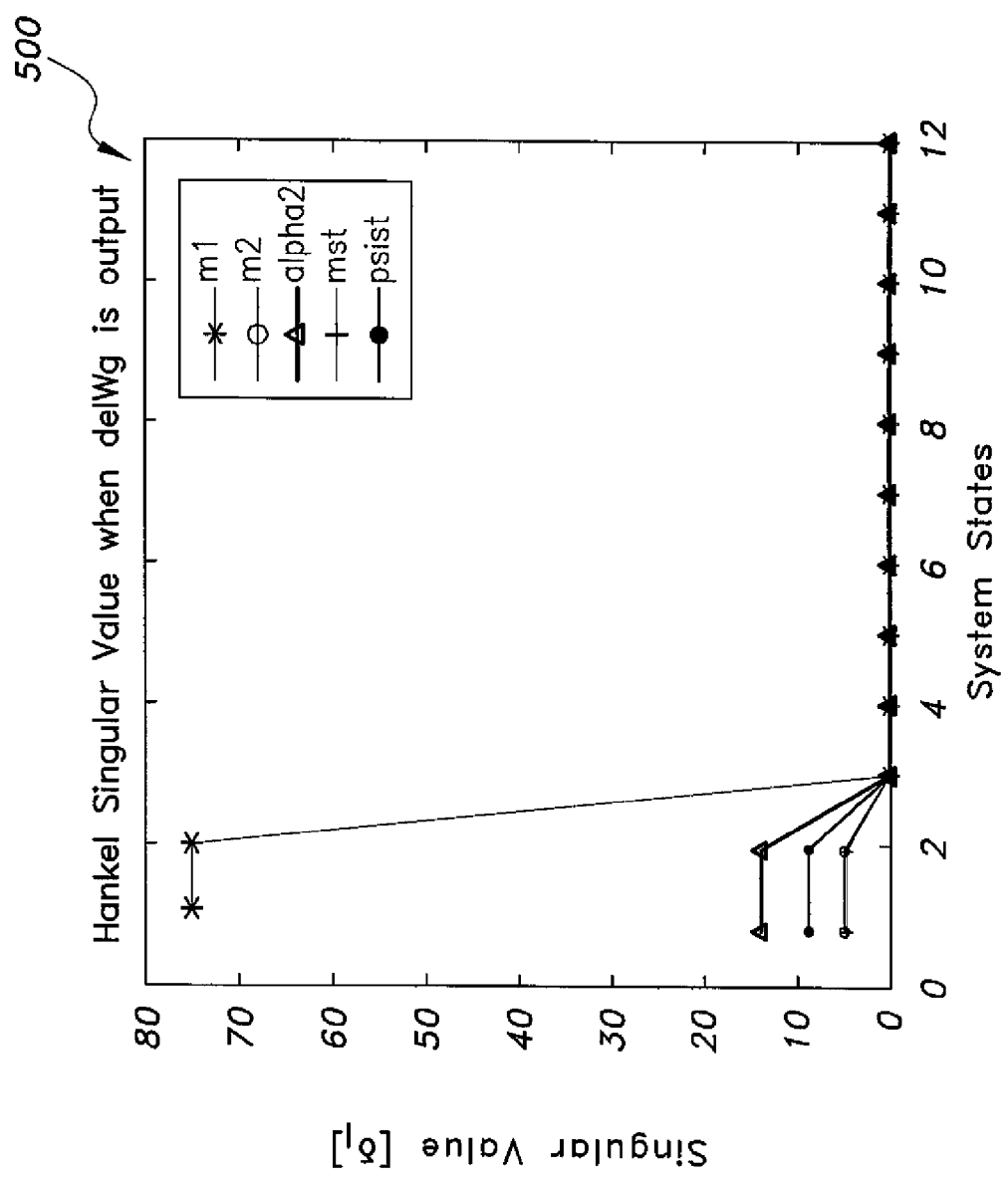
FIG. 5 is a plot showing system states vs. Hankel Singular Value indices when the STATCOM is connected at grid side-converter according to the present invention.

Plot 500 of FIG. 5 shows the variation of the HSV indices for the 5 control variables [$m_1$, $m_2$, $\alpha_2$, $m_{st}$, $\Psi_{st}$] against the states of the system corresponding to the 12 Eigen values. As in the case of SVD, the HSV for modulation index of rectifier ($m_1$) is largest when STATCOM 106 is connected at grid side-converter.

Figure 6:
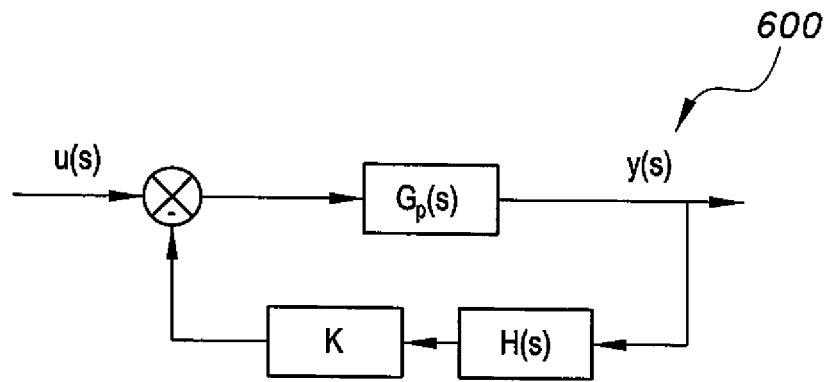
FIG. 6 is a block diagram showing the location of the controller in the PMSG system, according to the present invention.

Using the residue principles of the linearized system, feedback control signals which have the higher potential for providing damping can be identified and controller structures designed. Consider that the controller is located at the feedback path in the plant configuration as shown in block circuit 600 of FIG. 6. K is the overall gain of the feedback circuit. The plant transfer function of the single-input single-output (SISO) system assuming D=0 is, $$G_P(s) = C(sI-A)^{-1}B \quad (13)$$

The transfer function $G_P(s)$ can be expanded in partial fraction in terms of B and C matrices, right Eigenvectors $V_i$, and the left Eigenvectors $U_i$ as;

$$G(s) = \sum_{i=1}^n \frac{CV_i U_i B}{(s - \lambda_i)}, \quad (14)$$

The residue $R_i$ of a particular mode i gives a measure of that mode's sensitivity to the feedback between the output y and input u. The residue associated with an Eigen value $\lambda_i$ and feedback transfer function KH(s) are related by $$\frac{\partial \lambda_i}{\partial K} = R_i \frac{\partial [KH(\lambda_i)]}{\partial K} = R_i H(\lambda_i) \quad (15)$$

For small changes of gain K the above can be written as, $$\Delta \lambda_i = R_i [KH(\lambda_i)] \quad (16)$$

Figure 7:
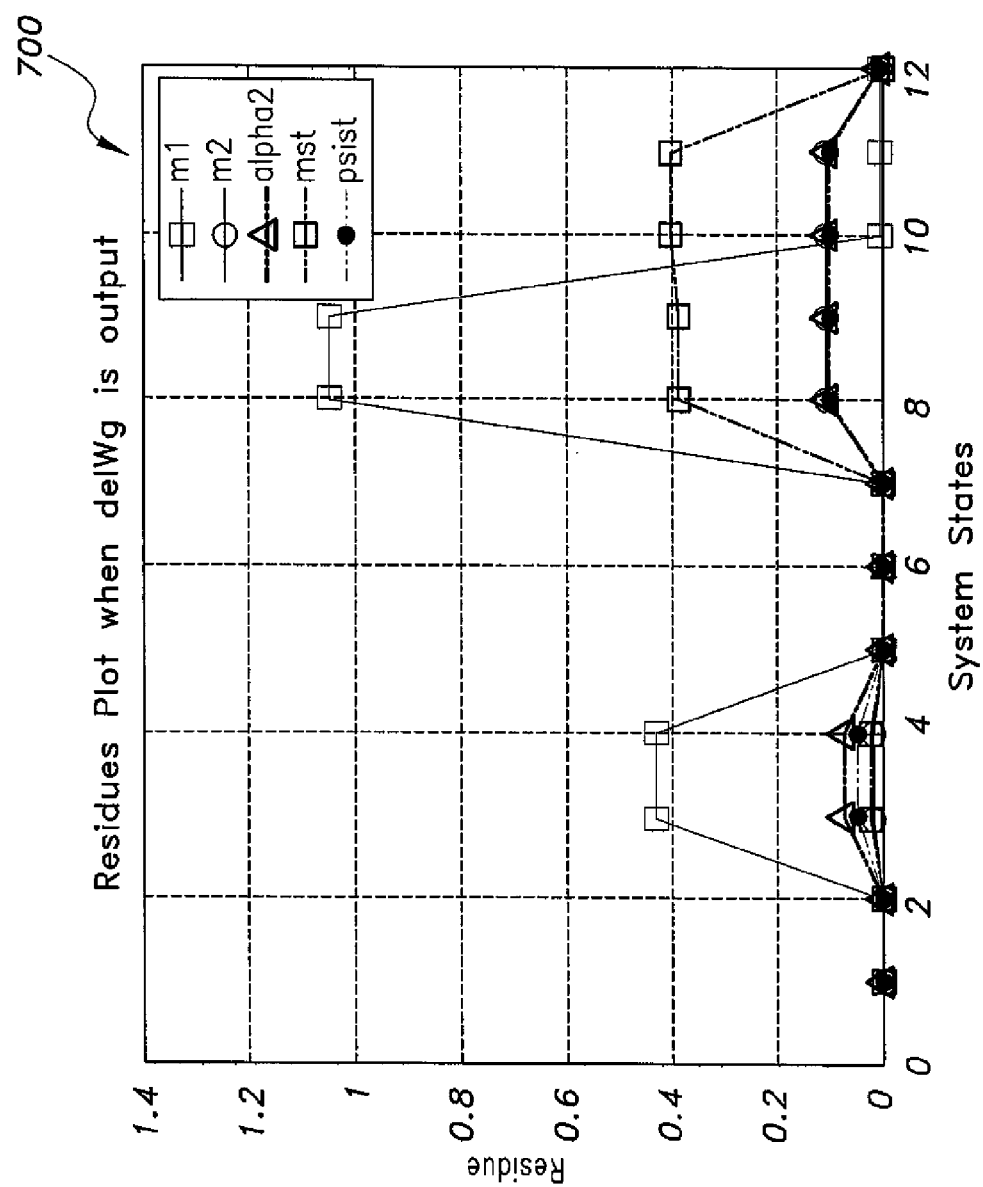
FIG. 7 is a plot showing residues when $\Delta\omega_g$ is taken as the output signal with the STATCOM being connected at grid side-converter, according to the present invention.

This indicates that the controller is most effective in damping mode i if an input is chosen so that $R_i$ is maximum. Therefore, the signal with highest observability is chosen as input to the controller. The change in Eigen value must be directed to the left half complex $\lambda$-plane. FIG. 7 shows the plot of residues 700 when the STATCOM 106 is connected at the grid side-converter when $\Delta\omega_g$ is taken as the output signal.

According to the residue plots 700 when the STATCOM 106 is connected at grid side converter:

a) the rectifier modulation index ($m_1$), exhibiting the largest residue properties will influence the behavior of the mode of oscillation corresponding to Eigen value #8 and #9, (−5.3±j315.0), and b) the feedback input signal should be the one corresponding to the Eigen value of state numbers 8 and 9, which is the inverter current ($\Delta i_i$) of the variable speed wind turbine PMSG system. Hence, we conclude that rectifier modulation index ($m_1$) is a preferred choice amongst the 5 inputs as indicated by SVD, HSV and residue methods, when the STATCOM 106 is connected at grid side-converter with generator speed ($\Delta\omega_g$) as the plant output. When selecting generator speed ($\Delta\omega_g$) as the plant output then d-q components of inverter currents (Eigen values #8 and #9) will be the best feedback control signal.

As observed the amount of wind power loading and the location of the STATCOM 106 play important roles in system performance and stability. This demands that voltage source converters shall be controlled in such a way that maximum possible power extraction from the wind below the rated wind speed is done continuously without affecting the system stability. A controller installed in the PMSG system can generally monitor the performance of the system in terms of real, reactive flow as well as system voltage. The controller should also be able to take emergency action to help the PMSG system operating near the stability threshold. The present invention utilizes a control strategy design based on the information obtained about possible inputs which can be modulated by the appropriate control signals. Once the selection of controller input from the five control variables [$m_1, m_2, \alpha_2, m_{st}, \Psi_{st}$] in terms of providing the damping to the system is determined, the next step is to design the controllers which will appropriately modulate the control variables. The controller structures used herein are PI as well as PID controls.

It has been observed that for ($\Delta\omega_g$) as the plant output the input ($m_1$) is more responsive to system damping needs and d-q components of inverter currents are the best candidates for any possible control action. Accordingly, the input signal to the controller configuration is considered to be inverter current ($\Delta i_i$), and input to the plant is considered to be ($m_1$) when STATCOM 106 is connected at grid side converter. Therefore, for the input-output pair ($m_1, \Delta\omega_g$), the plant transfer function is given by eqn. (14) when STATCOM 106 is connected at grid side-converter.

Figure 8:
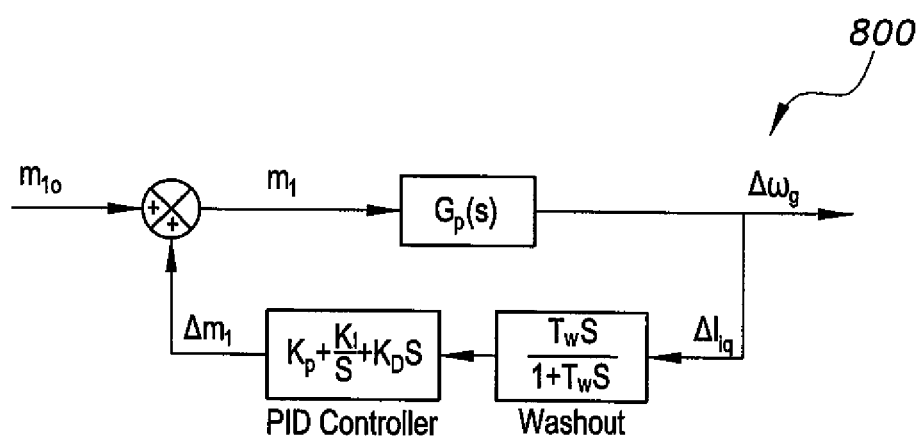
FIG. 8 is a block diagram of a PID feedback controller which can be used in the Variable Speed WT-PMSG, according to the present invention.

PI/PID controllers are designed to enhance performance of the variable speed wind turbine PMSG system. As shown in FIG. 8, a PI/PID controller 800 will normally be placed in the feedback path. A washout is provided in cascade with the controller to deactivate it under steady state conditions. The controller transfer function for PI controller takes the form, $$H(s) = \frac{sT_W}{1+sT_W}\left(K_P + \frac{K_I}{s}\right) \quad (17)$$

and for PID controller, the controller transfer function is:

$$H(s) = \frac{sT_W}{1+sT_W}\left(K_P + \frac{K_I}{s} + sK_D\right), \quad (18)$$

where $K_P$, $K_I$, and $K_D$ are the proportional, integral and differential constants, $T_W$ is the time constant of the washout block. Starting with the linearized system equations, the gains of the PI/PID controllers are obtained using frequency based optimization procedure.

Pole placement or full state feedback is a method employed in the feedback control system theory to place the poles of closed loop plant in the desired location in the s-plane. Placement of the poles for a specific damping ratio ($\zeta_{new}$) is desirable because it allows controlling the characteristics of the response by changing the Eigen values of the system. This method is applicable only if the system is controllable. The steps involved include determining the poles of the uncompensated plant given by the system equations, $$\dot{x} = Ax + Bu$$
$$y = Cx \quad (19)$$

Next, the damping ratio ($\zeta_{old}$) is calculated for the dominant Eigen values of the system. Then determine how much to the left of $\lambda$-plane, the Eigen values have to be shifted in order to get the desired damping. These Eigen values are recorded as $\lambda 1,2 = -\sigma \pm j\omega$. For the desired Eigen values, the closed loop system including the feedback controller $H(\lambda)$ should satisfy the requirement, $$\det[I - \lambda J^{-1}BH(\lambda)C] = 0 \quad (20)$$

thereby yielding:

$$H(\lambda) = (C(\lambda I - A)^{-1}B)^{-1} \quad (21)$$

Another expression for $H(\lambda)$ comes from the feedback controller being selected such as PI/PID controller. From equating this other expression and eqn. (21), controller gains can be computed.

The PID design through the pole placement method forces the closed loop Eigen values to the desired location. The gain settings $K_P$, $K_I$ and $K_D$ can be computed by assigning a pair of pre-specified Eigen values $\lambda = \lambda 1$ and $\lambda = \lambda 2$ of the closed loop of FIG. 8. This is usually referred to as the pole-assignment or pole-placement method. Hence, it is expected that the transient response provided by this controller will be better than the PI controller. From the equation (18) it can be shown that for any Eigen value $\lambda_i$, $$H(\lambda_i) = \frac{\lambda_i T_W}{1 + \lambda_i T_W}\left(K_P + \frac{K_I}{\lambda_i} + \lambda_i K_D\right) \quad (22)$$

For dominant Eigen values $\lambda_1=-\sigma_1+j\omega_1$, $\lambda_2=-\sigma_2$, equation (21) can be written as $$H(\lambda_1) = H_{R1} + jH_{I1} = (C(\lambda_1 I - A)^{-1}B)^{-1} \quad (23)$$

$$H(\lambda_2) = H_{R2} = (C(\lambda_2 I - A)^{-1}B)^{-1}. \quad (24)$$

Before applying pole-placement technique, we shall find the damping ratio ($\zeta_{old}$) of the dominant Eigen value for the uncompensated system, i.e., $$\zeta_{old} = \frac{-\sigma_1}{\sqrt{(-\sigma_1^2 + \omega_1^2)}} \quad (25)$$

$$\omega_{1n} = \frac{-\sigma_1}{\zeta_{old}}$$

After knowing the damping ratio ($\zeta_{old}$) for the dominant Eigen value being selected based on the residue method, we shall utilize the pole-placement technique to provide the desired damping ratio ($\zeta_{new}$) for improving the stability of the system. The new location of the dominant Eigen value ($\lambda_{1new}$) in terms of the desired damping ratio ($\zeta_{new}$) will be;

$$\lambda_{1new} = -\sigma_{1n} + j\omega_{1n} = -\zeta_{new}\omega_{1n} + j\omega_{1n}\sqrt{1-\zeta_{new}^2} \quad (26)$$

For the new Eigen value ($\lambda_{1new}$), equations (22) and (23) can be written as;

$$H(\lambda_{1new}) = \frac{\lambda_{1new}T_W}{1 + \lambda_{1new}T_W}\left(K_P + \frac{K_I}{\lambda_{1new}} + \lambda_{1new}K_D\right) \quad (27)$$

and $$H(\lambda_{1new}) = H_{R1} + jH_{I1} = (C(\lambda_{1new}I - A)^{-1}B)^{-1} \quad (28)$$

By using equations (24), (26)-(28), we get;

$$K_P = \frac{H_{I1}}{\omega_{1n}T_W} + \frac{(H_{R1}\omega_{1n} + H_{I1}\sigma_{1n})}{\omega_{1n}} - 2\sigma_{1n}K_D \quad (29)$$

$$K_I = \frac{H_{R2}}{T_W} + \sigma_2(H_{R2} - K_P - K_D\sigma_2) \quad (30)$$

$$K_D = \frac{(H_{R2} - H_{R1})\omega_{1n}(1 + \sigma_2 T_W) + H_{I1}(\sigma_{1n} - \sigma_2)(1 + \sigma_{1n}T_W)}{\omega_{1n}T_W((\sigma_{1n} - \sigma_2)^2 + \omega_{1n}^2)} + \frac{H_{I1}\omega_{1n}}{(\sigma_{1n} - \sigma_2)^2 + \omega_{1n}^2} \quad (31)$$

Hence, equations (29)-(31) give the values of the proportional, integral and differential gains, $K_P$, $K_I$ and $K_D$ when PID controller is taken in feedback as shown in FIG. 8. For designing a PI controller the same procedure mentioned above can be utilized except that instead of using two different dominant Eigen values as in the case of PID only one dominant Eigen value is sufficient to find the gains of the PI controller, i.e., by substituting $\lambda_2=0$, $H_{R2}=0$ and $K_D=0$ in equations (29)-(31), we get the expression of $K_P$ and $K_I$ for PI controller given by equations (32) and (33).

$$K_P = \frac{H_{I1}}{\omega_{1n}T_W} + \frac{(H_{R1}\omega_{1n} + H_{I1}\sigma_{1n})}{\omega_{1n}} \quad (32)$$

$$K_I = \frac{H_{R1}}{T_W} + \sigma_1(H_{R1} - K_P) - \omega_1 H_{I1} \quad (33)$$

Tables 4 and 5 below show the controller gains for PI/PID controller when $\Delta\omega g$ is taken as plant output for the preferred variable speed wind turbine PMSG system with grid side converter STATCOM.

TABLE 4

PI Controller gains when $\Delta\omega g$ is taken as plant output for WT-PMSG with STATCOM on grid side-converter

| System Configuration | Input Control | Feedback Signal | Actual Damping ($\zeta$old) | Desired Damping ($\zeta$new) | $K_p$ | $K_I$ |
|---|---|---|---|---|---|---|
| STATCOM At Grid Side-Converter | $m_1$ | $\Delta I_i$ | 0.0124 | 0.0145 | −45.2943 | −1986.7 |
| | $m_1$ | $\Delta\omega_g$ | 1.097e-4 | 0.30 | 23.8410 | 857.9652 |

TABLE 5

PID Controller gains when $\Delta\omega g$ is taken as plant output for WT-PMSG with STATCOM on grid side-converter

| System Configuration | Input Control | Feedback Signal | Actual Damping ($\zeta$old) | Desired Damping ($\zeta$new) | $K_p$ | $K_I$ | $K_D$ |
|---|---|---|---|---|---|---|---|
| STATCOM At Grid Side-Converter | $m_1$ | $\Delta I_i$ | 0.0124 | 0.0145 | −45.2943 | −58.6852 | 0.0150 |

We claim:

1. A wind turbine-permanent magnet synchronous generator (WT-PMSG) system having electrical circuitry delivering electrical power to a load connected to a grid via a power line, comprising:
   a permanent magnet synchronous generator (PMSG) variable speed wind turbine having a synchronous generator output;
   a back-to-back converter system including rectifier circuitry connected to the PMSG system in-line with the generator, inverter circuitry connected to the PMSG system in-line with the grid, and a DC link capacitor connecting the rectifier circuitry to the inverter circuitry, the rectifier circuitry including a modulation index control input;
   voltage source converter (VSC) circuitry including an output electrical circuit, the VSC circuitry being configured as a static synchronous compensator (STATCOM), the STATCOM being shunt connected to the load, the load being connected to the power line; and
   feedback control circuitry connected to the voltage PWM modulation index control input of the rectifier circuitry, said feedback control circuitry controlling the PWM modulation index of the rectifier circuitry responsive to a disturbance input to the feedback control system.

2. The wind turbine-permanent magnet synchronous generator (WT-PMSG) system, according to claim 1, wherein the feedback control circuitry comprises a proportional-integral (PI) controller.

3. The wind turbine-permanent magnet synchronous generator (WT-PMSG) system, according to claim 2, wherein the PI controller has a transfer function characterized by the relation, $$H(s) = \frac{sT_W}{1+sT_W}\left(K_p + \frac{K_I}{s}\right),$$

where $T_W$ is the time constant of a washout block portion of the PI controller, and $K_p$, $K_I$, are the proportional, and integral constants of the PI controller.

4. The wind turbine-permanent magnet synchronous generator (WT-PMSG) system, according to claim 3, wherein the disturbance input to the feedback control system is a disturbance in the inverter current ($\Delta i_i$).

5. The wind turbine-permanent magnet synchronous generator (WT-PMSG) system, according to claim 4, wherein the proportional, and integral constants, $K_p$, $K_I$, have values characterized by the relations, $$K_p = \frac{H_{I1}}{\omega_{1n}T_W} + \frac{(H_{R1}\omega_{1n}+H_{I1}\sigma_{1n})}{\omega_{1n}},$$

and $$K_I = \frac{H_{R1}}{T_W} + \sigma_1(H_{R1}-K_p) - \omega_1 H_{I1},$$

where $\sigma_{1n}$, $\sigma_1$ are real components of at least one dominant Eigen value of the system, $\omega_{1n}$, $\omega_1$ are imaginary components of said at least one dominant Eigen value of the system, said $\sigma_{1n}$, and said $\omega_{1n}$ being associated with the proportional constant $K_p$, said $\sigma_1$, and said $\omega_1$ being associated with the integral constant $K_I$, $H_{I1}$ being a constant associated with the dominant Eigen value imaginary components, and $H_{R1}$ being a constant associated with the dominant Eigen value real components.

6. The wind turbine-permanent magnet synchronous generator (WT-PMSG) system, according to claim 1, wherein the feedback control circuitry comprises a proportional-integral-derivative (PID) controller.

7. The wind turbine-permanent magnet synchronous generator (WT-PMSG) system, according to claim 6, wherein the PID controller has a transfer function characterized by the relation, $$H(s) = \frac{sT_W}{1+sT_W}\left(K_p + \frac{K_I}{s} + sK_D\right),$$

where $K_p$, $K_I$, and $K_D$ are the proportional, integral and differential constants, and $T_W$ is the time constant of a washout block portion of the PID controller.

8. The wind turbine-permanent magnet synchronous generator (WT-PMSG) system, according to claim 7, wherein the proportional, integral, and derivative constants, $K_p$, $K_I$, $K_D$ have values characterized by the relations, $$K_p = \frac{H_{I1}}{\omega_{1n}T_W} + \frac{(H_{R1}\omega_{1n}+H_{I1}\sigma_{1n})}{\omega_{1n}} - 2\sigma_{1n}K_D,$$

$$K_I = \frac{H_{R2}}{T_W} + \sigma_2(H_2-K_p-K_D\sigma_2),$$

and $$K_D = \frac{(H_{R2}-H_{R1})\omega_{1n}(1+\sigma_2 T_W)+H_{I1}(\sigma_{1n}-\sigma_2)(1+\sigma_{1n}T_W)}{\omega_{1n}T_W((\sigma_{1n}-\sigma_2)^2+\omega_{1n}^2)} + \frac{H_{I1}\omega_{1n}}{(\sigma_{1n}-\sigma_2)^2+\omega_{1n}^2},$$

where $\sigma_{1n}$, and $\sigma_2$ are real components of at least one dominant Eigen value of the system, $\omega_{1n}$, is an imaginary component of said at least one dominant Eigen value of the system, said $\sigma_{1n}$, and said $\omega_{1n}$ being associated with the proportional constant $K_p$, said $\sigma_2$ being associated with the integral constant $K_I$, a combination of said $\sigma_{1n}$, $\sigma_2$, and $\omega_{1n}$ being associated with the derivative constant $K_D$, $H_{I1}$ being a constant associated with the dominant Eigen value imaginary components, and $H_{R1}$, $H_{R2}$ being constants associated with the dominant Eigen value real component.

* * * * *